(12) United States Patent
Xie et al.

(10) Patent No.: US 11,735,730 B2
(45) Date of Patent: Aug. 22, 2023

(54) TERNARY PRECURSOR OF LITHIUM ION BATTERY AS WELL AS PREPARATION METHOD AND PREPARATION DEVICE

(71) Applicant: ZHEJIANG GREATWALL MIXERS CO., LTD., Wenzhou (CN)

(72) Inventors: Minghui Xie, Wenzhou (CN); Liang Wu, Wenzhou (CN); Zhijian Huang, Wenzhou (CN); Guozhong Zhou, Wenzhou (CN); Bingxin Wang, Wenzhou (CN); Shengxu Meng, Wenzhou (CN); Wancang Jing, Wenzhou (CN)

( * ) Notice: Subject to any disclaimer, the term of this patent is extended or adjusted under 35 U.S.C. 154(b) by 0 days.

(21) Appl. No.: 18/107,547

(22) Filed: Feb. 9, 2023

(65) Prior Publication Data
US 2023/0187633 A1 Jun. 15, 2023

(30) Foreign Application Priority Data
Feb. 9, 2022 (CN) .......................... 202210120568.1

(51) Int. Cl.
| | |
|---|---|
| *H01M 4/525* | (2010.01) |
| *H01M 10/0525* | (2010.01) |
| *H01M 4/1391* | (2010.01) |
| *H01M 4/131* | (2010.01) |
| *H01M 4/505* | (2010.01) |

(52) U.S. Cl.
CPC ........... *H01M 4/525* (2013.01); *H01M 4/131* (2013.01); *H01M 4/1391* (2013.01); *H01M 4/505* (2013.01); *H01M 10/0525* (2013.01)

(58) Field of Classification Search
CPC .... H01M 4/525; H01M 4/131; H01M 4/1391; H01M 4/505; H01M 10/0525
USPC .......................................................... 429/223
See application file for complete search history.

(56) References Cited

U.S. PATENT DOCUMENTS

2023/0009617 A1* 1/2023 Zhu ....................... H01M 4/366

FOREIGN PATENT DOCUMENTS

| CN | 202191906 U | 4/2012 |
|---|---|---|
| CN | 108128814 A | 6/2018 |
| CN | 112850807 A | 5/2021 |
| CN | 113843051 A | 12/2021 |

\* cited by examiner

*Primary Examiner* — Gary D Harris
(74) *Attorney, Agent, or Firm* — Jose Cherson Weissbrot (57) ABSTRACT

A ternary precursor of a lithium ion battery as well as a preparation method and preparation device thereof are provided. A chemical general formula of the ternary precursor is $Ni_xCo_yMn_z(OH)_2$, $0.5 \leq x \leq 0.9$, $0.05 \leq y \leq 0.3$, and $x+y+z=1$. A particle size D50 of a large-particle ternary precursor is 10.0-16.0 μm, a particle size D50 of a small-particle ternary precursor is 3.0-6.0 μm, and a span is 0.2-0.8. A nucleation and growth process of a crystal is regulated through a staged EDCF, a crystal particle size meeting specific requirements and compact particles without a cracking phenomenon can be obtained. A disc, inclined blades and an arc surface are combined, and an arc-shaped curved surface can effectively reduce a turbulence energy dissipation rate of a local area.

2 Claims, 3 Drawing Sheets

TERNARY PRECURSOR OF LITHIUM ION BATTERY AS WELL AS PREPARATION METHOD AND PREPARATION DEVICE

TECHNICAL FIELD

The present disclosure relates to the technical field of powder materials, particularly to a ternary precursor of a lithium ion battery as well as a preparation method and preparation device thereof.

BACKGROUND

At present, new energy automotive industry is developing with high quality. According to carbon peaking and carbon neutrality goals, from 2021, new energy vehicles will not be less than 80% of public service vehicles such as buses, taxis, and logistics vehicles in the national ecological civilization pilot zone and key areas for air pollution prevention and control. In 2025, the sales of new energy vehicles will account for 20%. In 2035, pure electric vehicles will become the mainstream of sales, and public service vehicles will be fully electric. The cost of positive electrode materials in power battery accounts for more than 40%, and its performance directly determines an upper limit of power battery capacity, which is the most core link in battery materials.

Due to the advantages of high discharge capacity and good cycling performance, the proportion of lithium nickel cobalt manganate (ternary) has been gradually increased in the application of cathode materials. According to a classical theoretical model for a hexagonal close-packed structure, filling small particles in the interspace of large spherical particles can make effective use of space. Therefore, through mixing of large and small particles under different grading, the mixing combination based on the highest compaction density of specific large and small particles can be found. The compaction density of a multi-component material prepared by this process is 5%-10% higher than that of a conventional multi-component material, and an energy density per unit volume of a battery is also improved. Therefore, a particle size distribution of a precursor for the positive electrode material needs to be as narrow as possible to achieve the effect of grading and the stability of material properties.

A coprecipitation method of the ternary precursor is based on precipitation reaction crystallization, which is a widely used preparation process in industry at present, and is also the best method to prepare a spherical ternary precursor. Generally, the most commonly used method is a hydroxide coprecipitation method. Its main process route is as follows: a nickel cobalt manganese soluble saline solution and sodium hydroxide aqueous solution are subjected to a crystallization precipitation reaction under the action of ammonia and other complexing agents, and undergo the process of crystal nucleus formation, crystal nucleus growth, etc. to generate nickel cobalt manganese hydroxide precipitation with a certain particle size distribution, crystal structure and surface micro morphology. Generally, a large-particle precursor has a particle size of 10-16 μm, and a small-particle precursor has a particle size of 3-6 μm.

An uneven particle size distribution of the precursor will lead to the uneven particle size distribution of positive electrodes. There will be different degrees of overcharge and over-discharge between large particles and small particles during a charging and discharging process of a battery, affecting electrochemical performance and structural stability of a material, and causing the reduction of cycle life. In addition, the ternary precursor, especially a high-nickel precursor, is prone to cracking during synthesis. The cracking of the precursor will directly lead to a poor cycling performance of the positive electrode materials. At present, main preparation methods in the preparation of the precursor are as follows: (1) it is achieved by adjusting process parameters, such as pH value, temperature, ammonia concentration or a dropping rate of the alkali solution and metal solution. (2) It can be controlled by adjusting the crystallization operation mode, such as a multi-stage continuous overflow method, a multi-stage series batch method, a semi-continuous semi-batch method of a mother-child reactor and the like. The above control methods are limited to the volume during preparation, and do not fully consider the macro/micro shear and mixing environment in the reactor. If the same results cannot be obtained due to the volume change, or the amplification effect in the amplification process, the ternary precursor will not be prepared successfully.

In view of the current common preparation method of the ternary precursor, which cannot adapt to different volumes of reactors at the same time, and the uneven particle size distribution and crystal particle cracking phenomenon exist in the preparation process, the present disclosure develops a preparation method and preparation device for preparing a ternary precursor of a lithium ion battery, and the obtained precursor has characteristics of satisfying the required particle size, concentrated particle size distribution, compactness and good sphericity, higher compaction density, etc.

SUMMARY

One objective of the present disclosure is to provide a ternary precursor of a lithium ion battery as well as a preparation method and preparation device thereof, which overcome the shortcomings of the prior art, such that the prepared ternary precursor of a lithium ion battery has advantages of concentrated particle size distribution, narrower span, higher compaction density, uniform appearance and no cracking phenomenon.

Another objective of the present disclosure is to provide a ternary precursor of a lithium ion battery as well as a preparation method and preparation device thereof. By using a mixed flow disc turbine impeller of the preparation device, a larger impeller diameter ratio and a reasonable layer spacing arrangement are adopted to shorten a mixing time and improve uniform distribution of materials and crystalline particles, and thus a narrower particle size distribution is obtained.

To achieve the above objectives, the technical solution adopted by the present disclosure is as follows:

According to a first aspect provided in the present disclosure, the preparation method for the ternary precursor of the lithium ion battery includes steps of:

S1, preparing a nickel cobalt manganese metal salt solution having a concentration of 1.0-3.0 mol/L, an ammonia solution having a concentration of 6.0-12 mob/L, and a sodium hydroxide solution having a concentration of 4.0-10 mol/L;

S2, adding water into a reactor, introducing a protective gas into the reactor, adding the prepared nickel cobalt manganese metal salt solution, a precipitant solution and a complexing agent solution into the reactor, respectively, and starting stirring;

S3, controlling a reaction temperature to be 40-70° C., a pH value to be 10.5-12.5 and an ammonia concentration to be 2.0-12 g/L, controlling an energy dissipation circulation function (EDCF) to be 0.05-65 kW/(m³·s); and stopping the reaction until crystalline particles reach the standard to obtain a ternary precursor slurry; and S4, carrying out solid-liquid separation, washing, drying and sieving on the ternary precursor slurry to obtain the ternary precursor of cathode materials for the lithium ion battery.

In an example, the step S3 includes steps of:

S311, controlling a reaction temperature to be 40-70° C., a pH value to be 10.5-12.5 and an ammonia concentration to be 2.0-12 g/L, and controlling the EDCF to be 30-45 kW/(m-s);

S312, when a feed liquid reaches an overflow port, enabling the feed liquid to overflow into a concentrator for concentration, returning the concentrated slurry to the reactor through a reflux port for continuous reaction, and discharging mother liquor from the reactor;

S313, when a solid content of the crystalline particles reaches 100-400 g/L, controlling the EDCF to be 10-30 kW/(m₃·s); when the solid content of the crystalline particles reaches 300-600 g/L, controlling the EDCF to be 1.0-10 kW/(m³·s); and when the solid content of the crystalline particles reaches 500-1000 g/L, controlling the EDCF to be 0.05-0.5 kW/(m³·s);

S314, continuing to control the pH value, the ammonia concentration and the temperature in the reaction process, stopping the reaction when the particle size D50 reaches 10.0-16.0 μm, and obtaining the large-particle ternary precursor slurry.

In an example, the step S3 includes steps of:

S321, controlling the reaction temperature to be 40-70° C., the pH value to be 10.5-12.5 and the ammonia concentration to be 2.0-12 g/L, and controlling the EDCF to be 45-65 kW/(m³·s);

S322, when a feed liquid reaches an overflow port, enabling the feed liquid to overflow into a concentrator for concentration, returning the concentrated slurry to the reactor through a reflux port for continuous reaction, and discharging mother liquor from the reactor;

S323, when the solid content of the crystalline particles reaches 100-400 g/L, controlling the EDCF to be 40-55 kW/(m³·s); when the solid content of the crystalline particles reaches 300-600 g/L, controlling the EDCF to be 25-40 kW/(m³·s); and when the solid content of the crystalline particles reaches 500-1000 g/L, controlling the EDCF to be 15-35 kW/(m³·s);

S324, continuing to control the pH value, the ammonia concentration and the temperature in the reaction process, stopping the reaction when the particle size D50 reaches 3.0-6.0 μm, and obtaining the small-particle ternary precursor slurry.

In an example, the preparation method for the ternary precursor of the lithium ion battery further includes S5: after starting stirring in S2, obtaining a stirring power consumption and a mixing time by monitoring a torque, a motor current, a speed and a liquid level, and obtaining the EDCF through a reactor size, an impeller type and a blade size to characterize a shear action in the reactor, where the EDCF= $(P/kD^3)/t_m$, $k=\pi/4/(W/D)$, P is power consumption, W is a width of blades, D is a diameter of the impeller, and $t_m$ is the mixing time, and $P=2\pi NT_q$, N is a stirring rotation speed, $T_q$ is a stirring torque.

In an example, the mixing time $t_m=5.2N_p^{-1/3}(D/T)^2(H_z/f)^\alpha/N$, $N_p$ is a power number of the blade, T is a tank diameter, $H_z$ is a liquid level height, and the power consumption P is obtained by measuring the torque, $P=\rho N_p N^3 D^3$, in which ρ is a solution density, an index α is obtained by calculating the mixing time obtained by a conductivity method or a pH value method.

According to a second aspect provided in the present disclosure, a preparation device for the ternary precursor of the lithium ion battery includes:

a reactor provided with a liquid inlet and an inner chamber, where the liquid inlet is connected with the inner chamber and an outside world, and the liquid inlet is provided on the upper part of the reactor;

a stirring drive system including a motor, a reducer and a stirring mechanism, where the reducer is connected to the motor and the stirring mechanism, the stirring mechanism is installed in the inner chamber of the reactor and includes a stirring shaft and at least one turbine impeller, the stirring shaft is rotatably connected to the reducer and the turbine impeller including multiple blades and a disc, the disc is connected to the stirring shaft, the blades extend outwards from a peripheral side of the disc obliquely in an arc, and a tilt angle of the blades is 30-80°.

In an example, the blades each include a main blade and a secondary blade, one end of the main blade is fixedly connected to the disc, and the secondary blade extends outward from the other end of the main blade in the direction of an arc surface, where the secondary blade is in a sine curve, y=A sin ωx, an amplitude A is 0.1-1.0 times of the width of the blade, a period T=2π/ω, having a range of 1-3, and the length of the secondary blade accounts for 10%-50% of the total length of the blade.

In an example, each turbine impeller further includes a hub and multiple connection plates. The hub is located in the middle of the disc to be fixedly connected to the stirring shaft, and the connection plates are evenly distributed along the periphery of the disc, so that the main blades are obliquely fixed to the connection plates, where the length of the blades accounts for 10%-40% of a diameter of the turbine impeller, the ratio of the diameter of the turbine impeller to the diameter of the reactor is 0.3-0.6:1, the reactor is provided with at least two layers of the turbine impellers, each of the turbine impellers includes 4-8 blades, and a ratio of layer spacing between the turbine impellers to the diameter of the turbine impellers is 0.6-1.5:1.

In an example, the preparation device further includes a concentrator, a torque sensor and a tachometer, where the torque sensor and the tachometer are respectively connected to the stirring shaft, and the reactor is further provided with a first liquid inlet, a second liquid inlet, a third liquid inlet, an overflow port and a reflux port. The first liquid inlet and the second liquid inlet are staggered at the upper part of the reactor, the first liquid inlet and the third liquid inlet are provided on the same side, the first liquid inlet is used for introducing an ammonia solution, the third liquid inlet is used for introducing a nickel cobalt manganese metal salt solution, and the second liquid inlet is used for introducing the alkali solution. A stagger angle between the first liquid inlet and the second liquid inlet is 90°-180°, the overflow port and the reflux port are spaced at the side of the reactor, and the overflow port is higher than the reflux port. The concentrator is respectively connected with the overflow port and the reflux port, where the overflow port is located at a position 0.80-0.85 times the height of a straight section of the reactor.

According to a third aspect of the present disclosure, the chemical general formula of the ternary precursor of the lithium ion battery prepared by the preparation device is $Ni_xCo_yMn_z(OH)_2$, where 0.5≤x≤0.9, 0.05≤y≤0.3, and x+y+z=1. The particle size D50 of the large-particle ternary precursor is 10.0-16.0 μm, the particle size D50 of the small-particle ternary precursor is 3.0-6.0 μm, and the span is 0.2-0.8.

Compared with the prior art, beneficial effects of the present disclosure are as follows:

(1) The coprecipitation method for the preparation of the ternary precursor consists of the formation of crystal nucleus, the growth of crystal and the agglomeration of particles, which belongs to a rapid reaction crystallization process, and has high requirements for the intensity of stirring. In turn, the high-intensity stirring has a strong shear action on the formed crystals. On the one hand, the stirring shear action has a great correlation with the size of crystalline particles and has a great influence on the nucleation rate and growth rate of crystals; on the other hand, a high shear will cause severe collision between particles, leading to crystal cracking. The shear force in the stirred reactor is distributed unevenly. The area of the stirring blades belongs to a high shear area, and the shear force in other areas is much lower. The magnitude of shear on the crystal in the reactor is a function of the energy dispersion rate, and is also related to the retention time of the crystals in the high shear area. If the crystals undergo a high shear area for a longer time or at a higher frequency, the shear effect is stronger. Therefore, the energy consumption circulation function (EDCF for short) is used to describe the shear action in the reactor, and the calculation formula is $EDCF=\varepsilon/t_c$, where ε represents a local turbulent energy dissipation rate, and $t_c$ represents a calculation time. For the stirred reactor, it is proposed that the ratio of the power consumption of the area swept by local stirring blades to the mixing time is used for calculation, that is, the $EDCF=(P/kD^3)/t_m$, $k=\pi/4/(W/D)$, where P is the power consumption, W is the width of the blades, D is the diameter of the stirring impellers, $t_m$ is the mixing time, power $P=2\pi NT_q$, N is the stirring rotation speed, $T_q$ is the stirring torque, and the mixing time $t_m=5.2N_p^{-1/3}(D/T)^{-2}(H_z/T)^\alpha/N$. $N_p$ is a power number of the blades, T is a tank diameter. $H_z$ is a liquid level height, and the power is obtained by measuring the torque, and thereby $N_p$ is obtained by a formula $P=\rho N_p N^3 D^5$, in which ρ is a solution density, and the index α is obtained by calculating the mixing time obtained by a conductivity method or a pH value method. In the present disclosure, the EDCF is used to regulate the nucleation and growth process of crystals in stages, so that the crystal particle size with specific requirements and dense particles without cracking can be obtained. The $H_z$ liquid level can be dynamically adjusted, mainly because more low shear areas are given at a later stage of crystal growth to grow crystal particles, so as to obtain the required crystal particle size.

(2) With a larger impeller diameter ratio (D/T) and a relatively reasonable layer spacing arrangement, shorter mixing time can be obtained under the same power consumption, thus ensuring the uniform distribution of materials and crystal particles, and then obtaining a relatively narrow particle size distribution.

(3) By adopting the mixed flow disc turbine impeller and combining the disc, inclined blades and arc surface, the arc surface can effectively reduce the turbulent energy dissipation rate in local areas, so as to reduce the shearing action on crystal particles and prevent particle cracking while ensuring the circulation capacity.

(4) The first liquid inlet and the second liquid inlet are staggered with a stagger angle of 90°-180°, so that the ammonia solution is first complexed with the nickel cobalt manganese metal salt solution, and the alkali solution reacts quickly after being added. The staggered position can avoid the local burst nucleation, which leads to a wide particle size distribution.

In these figures: 10. reactor; 101. inner chamber; 102. first liquid inlet; 103. second liquid inlet; 11. overflow port; 12. reflux port; 20. stirring drive system; 21. motor; 22. reducer; 23. torque sensor; 24. tachometer; 25. stander; 26. stirring mechanism; 261. stirring shaft; 262. turbine impeller; 27. blade; 271. main blade; 272. secondary blade; 281. hub; 282. disc; 283. connection plate; 30. concentrator.

DETAILED DESCRIPTION OF THE EMBODIMENTS

The present disclosure will be further described below in conjunction with specific examples. It should be noted that, without conflict, the examples described below or the technical features can be arbitrarily combined to form new examples.

In the description of the present disclosure, it should be noted that location words, such as terms "center", "transverse", "longitudinal", "length", "width", "thickness", "up", "down", "front", "back", "left", "right", "vertical", "horizontal", "top", "bottom", "inside", "outside", "clockwise" and "counterclockwise", indicate the location and the position relationship based on the location or position relationship shown in the drawings, which is only for the convenience of describing the present disclosure and simplifying the description, rather than indicating or implying that the device or element referred to must have a specific location, be constructed and operated in a specific orientation, and cannot be understood as limiting the specific protection scope of the present disclosure.

It should be noted that terms such as "first", "second" and the like in the description and claims of the present disclosure are used to distinguish similar objects, not necessarily to describe a specific order or sequence.

The terms "comprise", "include" and "having" as well as any variations thereof in the description and claims of the present disclosure are intended to cover nonexclusive inclusion, for example, a process, method, system, product or device that includes a series of steps or units needs not be limited to those steps or units that are clearly listed, but may include other steps or units that are not clearly listed or are inherent to the process, method, product or device.

It should be noted that, as used in present disclosure, the terms "basically", "approximately" and similar terms are used as approximate terms, not as degree terms, and are intended to describe the inherent deviation in the measured value or calculated value to be recognized by those skilled in the art.

As specified in the present disclosure, it should also be noted that, unless otherwise specified and limited, the terms "setting", "installation", "connected" and "connection" should be understood in a broad sense, for example, they can be fixed connection, removable connection, or integrated connection, can also be mechanical connection or electrical connection; and can further be directly connected or can be connected by contact or indirectly through intermediate media, or can be the communication between two components. For those skilled in the art, the specific meanings of the above terms in the present disclosure can be understood in accordance with specific cases.

For the sake of clarity, the term "basically" or "generally" is used herein to imply the possibility of changes in values within an acceptable range known to those skilled in the art. According to one example, the term "basically" or "generally" used herein should be interpreted as implying a possible change of up to 10% above or below any specified value. According to another example, the term "basically" or "generally" used herein should be interpreted as implying a possible change of up to 5% above or below any specified value. According to one example, the term "basically" or "generally" used herein should be interpreted as implying a possible change of up to 2.5% above or below any specified value. For example, the phrase "substantially vertical" should be interpreted to include possible variations of exactly 90°.

Figure 1:
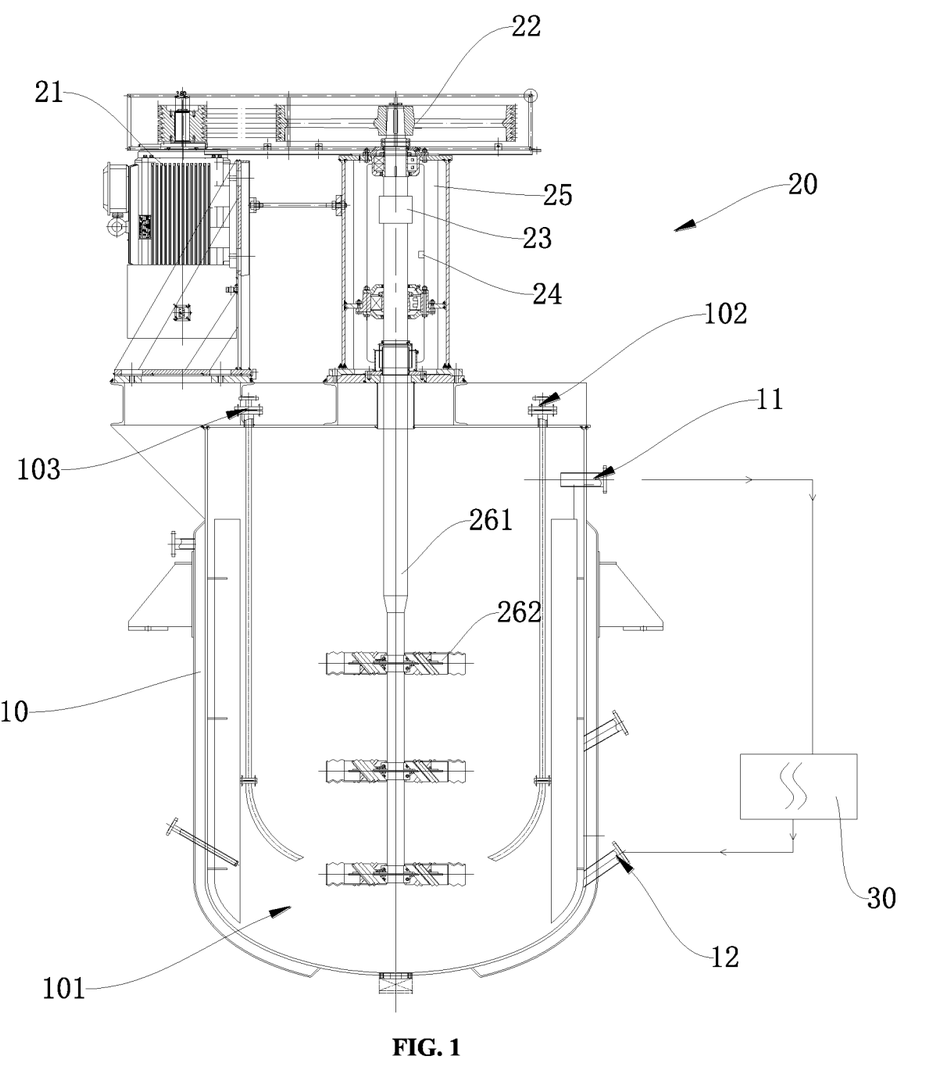
FIG. 1 is a schematic diagram of a preparation device for a ternary precursor of a lithium ion battery according to an example of the present disclosure.
Figure 2:
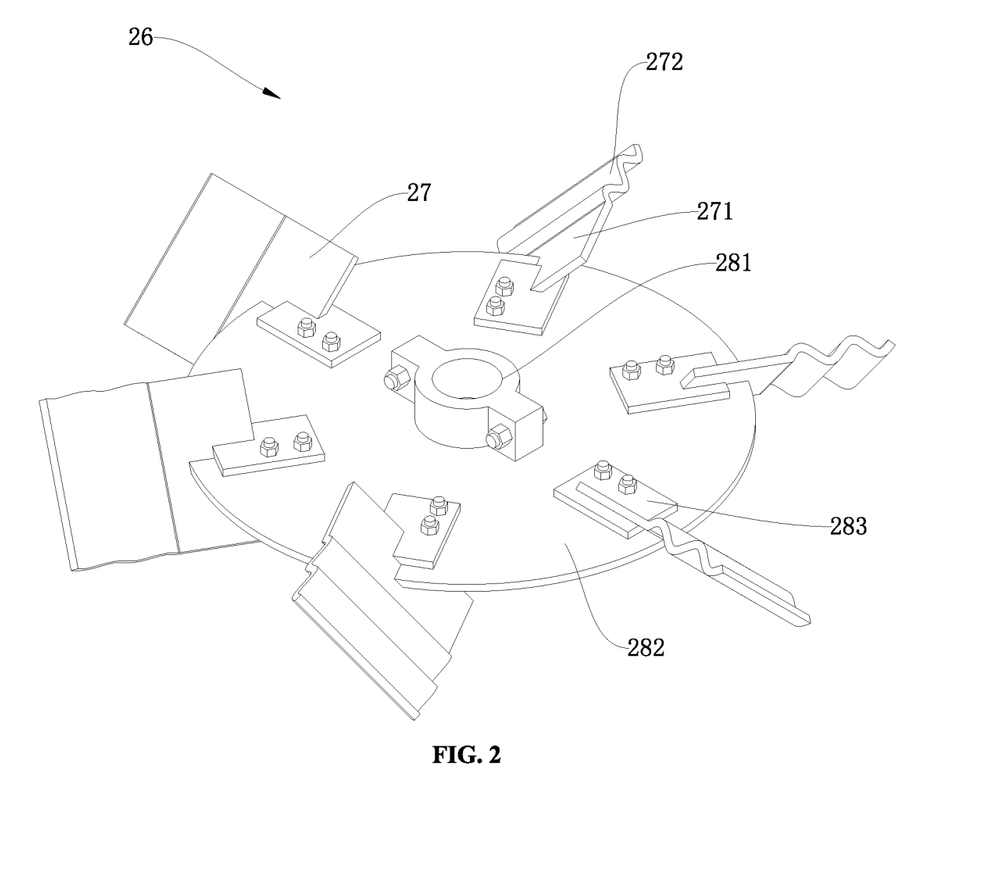
FIG. 2 is a three-dimensional view of a turbine impeller structure of the preparation device according to the above examples of the present disclosure.
Figure 3:
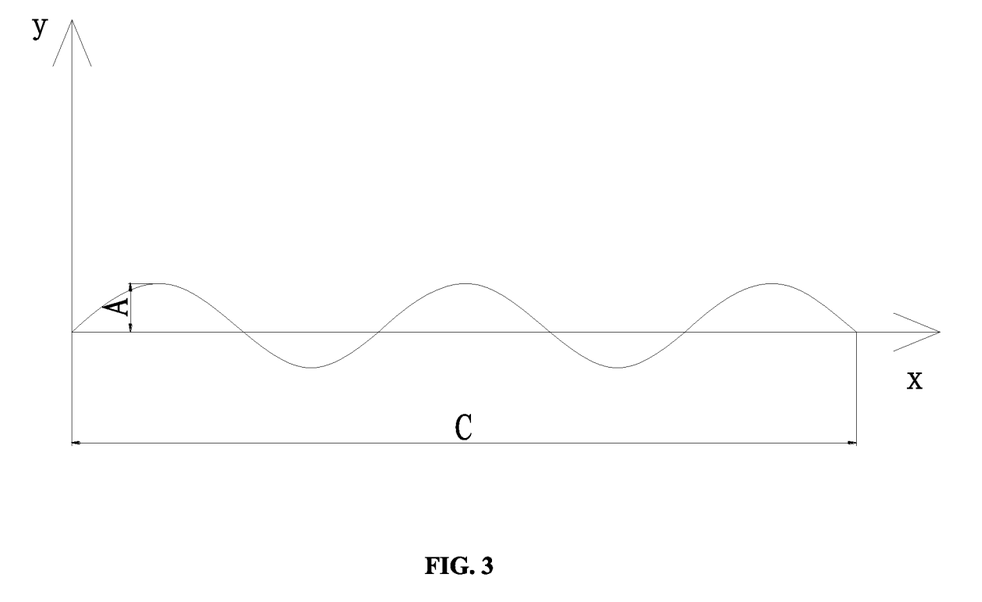
FIG. 3 is a curve diagram of the projection of secondary blades of the turbine impeller according to the above examples of the present disclosure.

According to a first aspect provided by the present disclosure, a preparation device for a ternary precursor of a lithium ion battery is shown in FIG. 1-FIG. 3. The preparation device includes a rector 10 and a stirring drive system 20. The rector 10 is provided with liquid inlets and an inner chamber 101. The liquid inlets are connected with the inner chamber 101 and the outside, and the liquid inlets are provided on an upper part of the reactor 10. The stirring drive system 20 includes a motor 21, a reducer 22 and a stirring mechanism 26. The reducer 22 is connected to the motor 21 and the stirring mechanism 26, the stirring mechanism 26 is installed in the inner chamber 101 of the reactor 10, and the stirring mechanism 26 includes a stirring shaft 261 and at least one turbine impeller 262. The stirring shaft 261 is rotatably connected to the reducer 22 and the turbine impeller 262. The turbine impeller 262 includes multiple blades 27 and a disc 282, the disc 282 is connected to the stirring shaft 261, the blades 27 extend outwards from a peripheral side of the disc 282 obliquely in an arc, and the tilt angle of the blades 27 is 30°-80°. Therefore, by combining the disc 282, inclined blades and the arc surface, the arc surface can effectively reduce the turbulent energy dissipation rate in local areas, so as to reduce the shear action on crystal particles and prevent particle cracking while ensuring the circulation capacity.

An output end of the motor 21 is connected with an input end of the reducer 22, the output end of the reducer 22 is connected with a top end of the stirring shaft 261, and a lower part of the stirring shaft 261 is fixedly connected with multi-layer turbine impeller.

In some examples, the blades 27 each include a main blade 271 and a secondary blade 272, one end of the main blade 271 is fixedly connected to the disc 282, and the secondary blade 272 extends outward from the other end of the main blade 271 in the direction of an arc surface, where the secondary blade 272 is in a sine curve, $y = A \sin \omega x$, an amplitude A is 0.1-1.0 times of the width of the blade 27, a period $T = 2\pi/\Omega$, having a range of 1-3, and the length of the secondary blade 272 accounts for 10%-50% of the total length of the blade 27. As shown in FIG. 3, A is the maximum recessed depth of the secondary blade 272, and C is the length of the secondary blade. That is, the tilt angles and tilt directions of the main blade 271 and the secondary blade 272 are the same, a plane on which the blade 27 is provided and a plane on which the disc 282 is provided intersect obliquely. The main blade 271 is of a plane structure, and the secondary blade 272 is of a wavy arc curved surface structure.

The specific values of a period T may be 1, 1.5, 2, 2.5 and 3. The length of the secondary blade 272 may account for 10%, 20%, 25%, 30%, 32%, 35%, 38%, 40%, 42%, 45%, 48% and 50% of the total length of the blade 27.

In some examples, each of the turbine impellers 262 further includes a hub 281 and multiple connection plates 283, the hub 281 is located in the middle of the disc 282 and is fixedly connected to the stirring shaft 261, and the connection plates 283 are evenly distributed along the periphery of the disc 282, so that the main blades 271 are obliquely fixed to the connection plates 283. As shown in FIG. 2, the length of the blade 27 accounts for 10%-40% of the diameter of the turbine impeller 262, and the ratio of the diameter of the turbine impeller 262 to the diameter of the reactor 10 is 0.3-0.6:1. The reactor 10 is internally provided with at least two layers of the turbine impellers 262, each of the turbine impellers 262 includes 4-8 blades 27, and the ratio of the layer spacing between the turbine impellers 262 to the diameter of the turbine impellers 262 is 0.6-1.5:1. With a larger D/T and a relatively reasonable layer spacing arrangement, a shorter mixing time can be obtained under the same power consumption, thus ensuring the uniform distribution of materials and crystal particles, and then obtaining a relatively narrow particle size distribution.

Preferably, the turbine impellers 262 each include 6 blades 27, and each of the blades 27 is inclined along the disc 282, and the blades 27 have the same tilt angle.

Preferably, the turbine impellers 262 are of a three-layer structure.

In some examples, the preparation device further includes a concentrator 30. The reactor 10 is further provided with a first liquid inlet 102, a second liquid inlet 103, a third liquid inlet, an overflow port 11 and a reflux port 12. The first liquid inlet 102 and the second liquid inlet 103 are staggered at the upper part of the reactor 10. The first liquid inlet 102 and the third liquid inlet are provided on the same side (since the first liquid inlet 102 and the third liquid inlet are provided on the same side, the third liquid inlet coincides with the first liquid inlet 102, which is not shown). The first liquid inlet 102 is used to introduce the ammonia solution, the second liquid inlet 103 is used to introduce the alkali solution, and the third liquid inlet is used to introduce the nickel cobalt manganese metal salt solution. A stagger angle between the first liquid inlet 102 and the second liquid inlet 103 is 90°-180°, so that the ammonia solution is firstly complexed with the nickel cobalt manganese metal salt solution, the alkali solution reacts rapidly after being added, and the staggered position can avoid local burst nucleation, which leads to a wider particle size distribution. The overflow port 11 and the reflux port 12 are spaced at the side of the reactor 10. The overflow port 11 is higher than the reflux port 12. The overflow port 11 and the reflux port 12 are respectively connected with the concentrator 30. When reaching the overflow port 11, the feed liquid overflows into the concentrator 30 for concentration, and the concentrated slurry returns to the reactor 10 through the reflux port 12 for continuous reaction, and the mother liquor is discharged from the reactor 10.

In some examples, the preparation device further includes a stander 25, a torque sensor 23, and a tachometer 24. The stander 25 is fixed on the upper end of the reactor 10. The stander 25 can be fixed on the reducer 22. The torque sensor 23 and the tachometer 24 are connected to the stirring shaft 261, respectively. The stirring consumption power and mixing time are obtained by detecting the torque, motor 21 current, rotation speed, and liquid level.

The ratio of the height of the reactor 10 to the diameter of the reactor is 1-1.6:1, and the overflow port 11 is located at a position 0.80-0.85 times the height of a straight section of the reactor 10.

According to a second aspect of the present disclosure, the ternary precursor of the lithium ion battery prepared by the preparation device, the chemical general formula of the ternary precursor is $Ni_xCo_yMn_z(OH)_2$, where $0.5 \leq x \leq 0.9$, $0.05 \leq y \leq 0.3$ and $x+y+z=1$. The particle size D50 of the large-particle ternary precursor is 10.0-16.0 μm, the particle size D50 of the small-particle ternary precursor is 3.0-6.0 μm, and the span is 0.2-0.8. The span is used to describe the concentration of the precursor particle size distribution. The smaller the span value, the more concentrated the particle size distribution. The span=(D90−D10)/D50, where D10 refers to the particle size corresponding to cumulative particle size distribution percentage reaching to 10%, D50 refers to the particle size corresponding to cumulative particle size distribution percentage reaching 50%, and D90 refers to the particle size corresponding to cumulative particle size distribution percentage reaching 90%.

According to a third aspect provided in the present disclosure, a preparation method of a large-particle ternary precursor includes steps of:

(1) preparing a nickel cobalt manganese metal salt solution having a concentration of 1.0-3.0 mol/L, an ammonia solution having a concentration of 6.0-12 mol/L, and a sodium hydroxide solution having a concentration of 4.0-10 mol/L;

(2) adding water into a sealed reactor until turbine impellers 262 of a bottom stirring mechanism 26 are submerged, introducing a protective gas into the reactor for 1-2 h, adding, by a pump, the prepared nickel cobalt manganese metal salt solution and ammonia solution into a reactor 10 through a first liquid inlet 102, adding the sodium hydroxide solution into the reactor 10 through a second liquid inlet 103, and starting stirring, obtaining a stirring power consumption and mixing time by monitoring the torque, a motor 21 current, the rotation speed and the liquid level; and for the specific reactor size, the impeller type and the size of blades 27, obtaining a variable, i.e., an energy consumption circulation function (EDCF), for characterizing the stirring shear action, and controlling the EDCF to be 30-45 kW/(m s);

(3) controlling the flow rate of the solution entering the reactor, the reaction temperature to be 40-70° C., the pH value to be 10.5-12.5, and the ammonia concentration to be 2.0-12 g/L; when the feed liquid reaches the overflow port 11, enabling the feed liquid to overflow into a concentrator 30 for concentration, returning the concentrated slurry to the reactor 10 through the reflux port 12 for continuous reaction, and discharging the mother liquor outside the reactor; when the solid content of crystalline particles reaches 100-400 g/L, controlling the EDCF to be 10-30 kW/(m$^3$·s); when the solid content of crystalline particles reaches 300-600 g/L, controlling the EDCF to be 1.0-10 kW/(m$^3$·s); when the solid content of crystalline particles reaches 500-1000 g/L, controlling the EDCF to be 0.05-0.5 kW/(m$^3$·s); and continuing to control the pH value, ammonia concentration and temperature in the reaction process, stopping reaction when the particle size D50 reaches 10.0-16.0 μm, and obtaining the large-particle ternary precursor slurry:

(4) carrying out solid-liquid separation, washing, drying and sieving on the large-particle ternary precursor slurry to obtain the large-particle ternary precursor $Ni_xCo_yMn_z(OH)_2$ of the positive electrode material for the lithium ion battery, where the particle size D50 is 10-16 μm, and the span is 0.2-0.8.

According to a fourth aspect provided in the present disclosure, the preparation method for a small-particle ternary precursor includes steps of:

(1) preparing a nickel cobalt manganese metal salt solution having a concentration of 1.0-3.0 mol/L, an ammonia solution having a concentration of 6.0-12 mol/L, and a sodium hydroxide solution having a concentration of 4.0-10 mol/L;

(2) adding water into a sealed reactor until turbine impellers 262 of a bottom stirring mechanism 26 are submerged, introducing a protective gas into the reactor for 1-2 h, adding, by a pump, the prepared nickel cobalt manganese metal salt solution and ammonia solution into a reactor 10 through a first liquid inlet 102, adding the sodium hydroxide solution into the reactor 10 through a second liquid inlet 103, and starting stirring, obtaining a stirring power consumption and mixing time by monitoring the torque, a motor 21 current, the rotation speed and the liquid level; for the specific reactor size, the impeller type and the size of the blades 27, obtaining a variable, i.e., an energy consumption circulation function (EDCF), for characterizing the stirring shear action, and controlling the EDCF to be 45-65 kW/(m$^3$·s);

(3) controlling the flow rate of the solution entering the reactor, the reaction temperature to be 40-70° C., the pH value to be 10.5-12.5, and the ammonia concentration to be 2.0-12 g/L; when the feed liquid reaches the overflow port 11, enabling the feed liquid to overflow into a concentrator 30 for concentration, returning the concentrated slurry to the reactor 10 through the reflux port 12 for continuous reaction, and discharging the mother liquor outside the reactor; when the solid content of crystalline particles reaches 100-400 g/L, controlling the EDCF to be 40-55 kW/(m$^3$·s); when the solid content of crystalline particles reaches 300-600 g/L, controlling the EDCF to be 25-40 kW/(m$^3$·s); when the solid content of crystalline particles reaches 500-1000 g/L, controlling the EDCF to be 15-35 kW/(m$^3$·s); and continuing to control the pH value, ammonia concentration and temperature in the reaction process, stopping the reaction when the particle size D50 reaches 3.0-6.0 μm, and obtaining the small particle ternary precursor slurry;

(4) carrying out solid-liquid separation, washing, drying and sieving on the small-particle ternary precursor slurry to obtain the small-particle ternary precursor $Ni_xCo_yMn_z(OH)_2$ of the positive electrode material for the lithium ion battery, where the particle size D50 is 3-6 μm, and the span is 0.2-0.8.

The EDCF is used to characterize a shear action in the reactor. The EDCF=$(P/kD^3)/t_m$, $k=\pi/4/(W/D)$, P is power consumption, W is the width of the blade 27, D is the diameter of the impeller, and $t_m$ is the mixing time, where P=$2\pi NT_q$, N is a stirring rotation speed, $T_q$ is a stirring torque, the mixing time $t_m$=$5.2N_p^{-1/3}(D/T)^2(H/T)^\alpha/N$, $N_p$ is a power number of the blade, T is a tank diameter, $H_z$ is a liquid level height, and the power consumption P is obtained by measuring the torque, P=$\rho N_p N^3 D5$, in which ρ is a solution density, the index α is obtained by calculating the mixing time obtained by a conductivity method or a pH value method.

Example 1

A preparation device for a ternary precursor of a lithium ion battery includes a rector 10 and a stirring drive system 20. The rector 10 is provided with a first liquid inlet 102, a second liquid inlet 103 and an inner chamber 101. The stirring drive system 20 includes a motor 21, a reducer 22 and a stirring mechanism 26. The reducer 22 is connected to the motor 21 and the stirring mechanism 26, the stirring mechanism 26 is installed in the inner chamber 101 of the reactor 10, and the stirring mechanism 26 includes a stirring shaft 261 and three layers of turbine impellers 262. The stirring shaft 261 is rotatably connected to the reducer 22 and the turbine impellers 262. Each of the turbine impellers 262 includes 6 blades 27 and a disc 282, the disc 282 is connected to the stirring shaft 261, the blades 27 extend outwards from a peripheral side of the disc 282 obliquely in an arc, and the tilt angle of the blades 27 is 45°. The first liquid inlet 102 and the second liquid inlet 103 are staggered by 180°.

The blades 27 each include a main blade 271 and a secondary blade 272. The secondary blade 272 is in a sine curve, y=A sin ωx, an amplitude A is 0.2 times of the width of the blade 27, a period T=2π/ω, having a range of 2. The length of the secondary blade 272 accounts for 20% of the total length of the blade 27. The length of the blade 27 accounts for 25% of the diameter of the turbine impeller 262, the blade 27 width of the main blade 271 is 0.2 times the blade 27 length, the ratio of the diameter of the turbine impellers 262 to the diameter of the reactor 10 is 0.45, and the ratio of the layer spacing between the turbine impellers 262 and the diameter of the turbine impellers 262 is 0.8.

The ratio of the height of the reactor 10 to the diameter of the reactor 10 is 1.2, and the overflow port 11 is located at a position 0.82 times the height of a straight section of the reactor 10.

Through the preparation device, a preparation method of a large-particle ternary precursor of a lithium ion battery includes steps of:

(1) preparing a nickel cobalt manganese metal salt solution having a concentration of 2 mol/L (a molar ratio of nickel to cobalt to manganese being 8:1:1), an ammonia solution having a concentration of 10 mol/L, and a sodium hydroxide solution having a concentration of 6 mol/L, the chemical general formula of the nickel cobalt manganese precursor being $Ni_xCo_yMn_z(OH)_2$, where $0.5 \leq x \leq 0.9$, $0.05 \leq y \leq 0.3$, and $x+y+z=1$;

(2) adding water into a sealed reactor until turbine impellers 262 of a bottom stirring mechanism 26 are submerged, introducing a protective gas into the reactor for 1-2 h, adding, by a pump, the prepared nickel cobalt manganese metal salt solution and ammonia solution into a reactor 10 through a first liquid inlet 102, adding a sodium hydroxide solution into the reactor 10 through a second liquid inlet 103, starting stirring, and obtaining a stirring power consumption and mixing time by monitoring the torque, a motor 21 current, the rotation speed and the liquid level; for the specific reactor size, the impeller type and the size of the blades 27, obtaining a variable, i.e., an energy consumption circulation function (EDCF), for characterizing the stirring shear action, and controlling the EDCF to be 35±5 kW/(m³·s);

(3) controlling the flow rate of the solution entering the reactor, the reaction temperature to be 50±0.2° C., the pH value to be 11.9±0.1, and the ammonia concentration to be 9.0±0.5 g/L; when the feed liquid reaches the overflow port 11, enabling the feed liquid to overflow into a concentrator 30 for concentration, returning the concentrated slurry to the reactor 10 through a reflux port 12 for continuous reaction, and discharging the mother liquor outside the reactor; when a solid content of crystalline particles reaches 300 g/L, controlling the EDCF to be 20±3 kW/(m³·s); when the solid content of crystalline particles reaches 500 g/L, controlling the EDCF to be 5±2 kW/(m³·s); when the solid content of crystalline particles reaches 800 g/L, controlling the EDCF to be 0.1±0.05 kW/(m³·s); and continuing to control the pH value, ammonia concentration and temperature in the reaction process, stopping the reaction when the particle size D50 reaches 12-13 μm, and obtaining the large-particle ternary precursor slurry;

(4) carrying out solid-liquid separation, washing, drying and sieving on the larger ternary precursor slurry to obtain a ternary precursor $Ni_{0.8}Co_{0.1}Mn_{0.1}(OH)_2$ of a positive electrode material for the lithium ion battery.

Example 2

The preparation devices of Example 2 and Example 1 are the same, but the difference is that a small-particle ternary precursor is prepared in the Example 2. Through the preparation device, A preparation method of a small-particle ternary precursor of the lithium ion battery includes steps of:

(1) preparing a nickel cobalt manganese metal salt solution having a concentration of 2 mol/L (a molar ratio of nickel to cobalt to manganese being 6:2:2), an ammonia solution having a concentration of 8 mol/L, and a sodium hydroxide solution having a concentration of 6 mol/L, the chemical general formula of the nickel cobalt manganese precursor being $Ni_xCo_yMn_z(OH)_2$, where $0.5 \leq x \leq 0.9$, $0.05 \leq y \leq 0.3$, and $x+y+z=1$.

(2) adding water into the sealed reactor until the turbine impellers 262 of the bottom stirring mechanism 26 are submerged, introducing a protective gas into the reactor for 1-2 h. adding, by a pump, the prepared nickel cobalt manganese metal salt solution and ammonia solution into the reactor 10 through the first liquid inlet 102, adding the sodium hydroxide solution into the reactor 10 through the second liquid inlet 103, starting stirring, and obtaining a stirring power consumption and mixing time by monitoring the torque, the motor 21 current, the rotation speed and the liquid level; for the specific reactor size, the impeller type and the size of the blades 27, obtaining a variable, i.e., an energy consumption circulation function (EDCF), for characterizing the stirring shear action, and controlling the EDCF to be 55±5 kW/(m³·s);

(3) controlling the flow rate of the solution entering the reactor, the reaction temperature to be 48±0.2° C., the pH value to be 12.2±0.1, and the ammonia concentration to be 9.0±0.5 g/L; when the feed liquid reaches the overflow port 11, enabling the feed liquid to overflow into the concentrator 30 for concentration, returning the concentrated slurry to the reactor 10 through the reflux port 12 for continuous reaction, and discharging the mother liquor outside the reactor; when the solid content of crystalline particles reaches 300 g/L, controlling the EDCF to be 50±5 kW/(m³·s); when the solid content of crystalline particles reaches 500 g/L, controlling the EDCF to be 35±5 kW/(m³·s); when the solid content of crystalline particles reaches 800 g/L, controlling the EDCF to be 25±3 kW/(m³·s); and continuing to control the pH value, ammonia concentration and temperature in the reaction process, stopping the reaction when the particle size D50 reaches 3-4 m, and obtaining the small-particle ternary precursor slurry;

(4) carrying out solid-liquid separation, washing, drying and sieving on the small ternary precursor slurry to obtain the ternary precursor $Ni_{0.6}Co_{0.2}Mn_{0.2}(OH)_2$ of the positive electrode materials for the lithium ion battery.

Comparative Example 1

The reactor 10 of the preparation device of Comparative Example 1 is the same as that of Example 1, but the difference is that the secondary blade 272 of the turbine impeller 262 is of a plane structure, and the turbine impeller 262 is provided with a common inclined blade disc 282. A preparation method of the large-particle ternary precursor includes steps of:

(1) preparing a nickel cobalt manganese metal salt solution having a concentration of 2 mol/L (a molar ratio of nickel to cobalt to manganese being 8:1:1), an ammonia solution having a concentration of 10 mol/L, and a sodium hydroxide solution having a concentration of 6 mol/L, the chemical general formula of the nickel cobalt manganese precursor being $Ni_xCo_yMn_z(OH)_2$, where $0.5 \leq x \leq 0.9$, $0.05 \leq y \leq 0.3$, and $x+y+z=1$;

(2) adding water into the sealed reactor and introducing the protective gas into the reactor for 1-2 h, and then adding, by a pump, the prepared metal mixed salt solution, a precipitant solution and a complexing agent solution into the reactor through their respective liquid inlet pipes, where the first liquid inlet 102 and the second liquid inlet 103 are staggered by 180 degrees, starting the stirring, controlling a pH value of a mixed system in the reactor to be 11.3-12.5, and the reaction temperature to be 40-60° C., and conducting the nucleation for 2-4 h to complete the nucleation stage;

(3) controlling the flow rate of the solution entering the reactor, reducing the pH value, controlling the reaction pH value to be 11.2-11.9, the reaction temperature to be 40-60° C., and the ammonia concentration to be 8.0-9.0 g/L for crystal nucleus growth; when the feed liquid reaches the overflow port 11, enabling the feed liquid to overflow into the concentrator 30 for concentration; returning the concentrated slurry to the reactor 10 through a reflux port 12 for continuous reaction, and discharging the mother liquid outside the reactor; and stopping the reaction when the particle D50 size reaches 12-13 μm:

(4) carrying out solid-liquid separation, washing, drying and sieving on the ternary precursor slurry obtained after reaction to obtain the large-particle ternary precursor $Ni_{0.8}Co_{0.1}Mn_{0.1}(OH)_2$ of the positive electrode materials of the lithium ion battery.

Comparative Example 2

A reactor 10 of Comparative Example 2 has the same size as that of Example 2, but the difference is that the secondary blade 272 of the turbine impeller 262 is of a plane structure, the turbine impeller 262 is provided with a common inclined blade disc 282. There are two layers of turbine impellers 262, a ratio of the diameter of the turbine impeller 262 to the diameter of the reactor 10 is 0.3, the ratio of the layer spacing of the turbine impellers 262 to the diameter of the turbine impeller 262 is 1.5, and the first liquid inlet 102 and the second liquid inlet 103 are provided on the same side. A preparation method of the small-particle ternary precursor includes steps of:

(1) preparing a nickel cobalt manganese metal salt solution having a concentration of 2 mol/L (a molar ratio of nickel to cobalt to manganese being 6:2:2), an ammonia solution having a concentration of 8 mol/L, and a sodium hydroxide solution having a concentration of 6 mol/L, the chemical general formula of the nickel cobalt manganese precursor being $Ni_xCo_yMn_z(OH)_2$, where $0.5 \leq x \leq 0.94$, $0.05 \leq y \leq 0.3$, and $x+y+z=1$;

(2) adding water into the sealed reactor and introducing the protective gas into the reactor for 1-2 h, and then adding, by a pump, the prepared metal mixed salt solution, a precipitant solution and a complexing agent solution into the reactor through their respective liquid inlet pipes, and starting stirring:

(3) controlling the flow rate of the solution entering the reactor, controlling the reaction temperature to be 48±0.2° C., the reaction pH value to be 12.2±0.1, and the ammonia concentration to be 9.0±0.5 g/L; when the feed liquid reaches the overflow port 11, enabling the feed liquid to overflow into a concentrator 30 for concentration, returning the concentrated slurry to the reactor through a reflux port 12 for continuous reaction, and discharging the mother liquid outside the reactor; and stopping the reaction when the particle size D50 reaches 3-4 μm;

(4) carrying out solid-liquid separation, washing, drying and sieving on the precursor slurry obtained after reaction to obtain the small-particle ternary precursor $Ni_{0.6}Co_{0.2}Mn_{0.2}(OH)_2$ of the positive electrode materials of the lithium ion battery.

Performance Testing

Performance tests were carried out on the ternary precursors prepared from Examples 1 and 2 and Comparative Examples 1 and 2, and test results were shown in Table 1.

TABLE 1

Test results for the ternary precursors prepared from Examples 1 and 2 and Comparative Examples 1 and 2

|  | D 10, μm | D 50, μm | D 90, μm | Span | Cracking or not |
|---|---|---|---|---|---|
| Example 1 | 8.91 | 12.61 | 17.54 | 0.68 | no cracking |
| Comparative Example 1 | 6.02 | 12.13 | 17.35 | 0.93 | cracking |
| Example 2 | 2.59 | 3.65 | 5.18 | 0.71 | no cracking |
| Comparative Example 2 | 1.25 | 3.32 | 5.46 | 1.27 | no cracking |

It could be seen from the results in Table 1 that the comparison between Example 1 and Comparative Example 1 indicated that the preparation method and preparation device of the present disclosure would obtain the required large-particle ternary precursor with a narrow particle size distribution and without particle cracking. In addition, the comparison between Example 2 and Comparative Example 2 indicated that the preparation method and preparation device of the present disclosure would obtain the required small-particle ternary precursor with a narrow distribution.

The basic principle, main features and advantages of the present disclosure are described above. Those skilled in the art should understand that the present disclosure is not limited by the above examples, and what is described in the above examples and the description is only the principle of the present disclosure. Without departing from the spirit and scope of the present disclosure, the present disclosure will have various changes and improvements, which fall within the scope of the present disclosure required to be protected. The scope of protection claimed in the present disclosure is defined by the appended claims and their equivalents.

What is claimed is:

1. A preparation method for a ternary precursor of a lithium ion battery, comprising steps of:

S1, preparing a nickel cobalt manganese metal salt solution having a concentration of 1.0-3.0 mol/L, an ammonia solution having a concentration of 6.0-12 mol/L, and a sodium hydroxide solution having a concentration of 4.0-10 mol/L;

S2, adding water into a reactor, introducing a protective gas into the reactor, adding the prepared nickel cobalt manganese metal salt solution, a precipitant solution and a complexing agent solution into the reactor, respectively, starting stirring, obtaining a stirring power consumption and a mixing time by monitoring a torque, a motor current, a rotation speed and a liquid level, and obtaining an energy dissipation circulation function (EDCF) through a reactor size, an impeller type and a blade size to characterize a shear action in the reactor, wherein the EDCF=$(P/kD^3)/t_m$, $k=\pi/4/(W/D)$, P is power consumption, W is width of blades, D is a diameter of the impeller, and $t_m$ is the mixing time, and P=$2\pi NT_q$, wherein N is a stirring rotation speed, $T_q$ is a stirring torque, the mixing time $t_m$=$5.2N_p^{-1/3}(D/T)^{-2}(H_zT)^{\alpha}/N$, $N_p$ is a power number of the impeller, T is a tank diameter, $H_z$ is a liquid level height, and the power consumption P is obtained by measuring the torque, P=$\rho N_p N^3 D^5$, in which $\rho$ is a solution density, and an index $\alpha$ is obtained by calculating the mixing time obtained by a conductivity method or a pH value method:

S3, controlling a reaction temperature to be 40-70° C., a pH value to be 10.5-12.5 and an ammonia concentration to be 2.0-12 g/L, controlling the EDCF to be 0.05-65 kW/(m³·s), and stopping the reaction until crystalline particles reach the standard to prepare a large-particle ternary precursor slurry or a small-particle ternary precursor slurry, when preparing the large-particle ternary precursor slurry, the step S3 comprises steps of:

S311, controlling the reaction temperature to be 40-70° C., the pH value to be 10.5-12.5 and the ammonia concentration to be 2.0-12 g/L, controlling the EDCF to be 30-45 kW/(m³·s);

S312, when a feed liquid reaches an overflow port, enabling the feed liquid to overflow into a concentrator for concentration, returning the concentrated slurry to the reactor through a reflux port for continuous reaction, and discharging a mother liquor from the reactor;

S313, when a solid content of the crystalline particles reaches 100-400 g/L, controlling the EDCF to be 10-30 kW/(m³·s); when the solid content of the crystalline particles reaches 300-600 g/L, controlling the EDCF to be 1.0-10 kW/(m³·s); when the solid content of the crystalline particles reaches 500-1000 g/L, controlling the EDCF to be 0.05-0.5 kW/(m³·s);

S314, continuing to control the pH value, the ammonia concentration and the temperature in the reaction process, stopping the reaction when the particle size D50 reaches 10.0-16.0 μm, and obtaining the large-particle ternary precursor slurry:

or when preparing the small-particle ternary precursor slurry, the step S3 comprises steps of:

S321, controlling the reaction temperature to be 40-70° C., the pH value to be 10.5-12.5 and the ammonia concentration to be 2.0-12 g/L, controlling the EDCF to be 45-65 kW/(m³·s):

S322, when the feed liquid reaches an overflow port, enabling the feed liquid to overflow into the concentrator for concentration, returning the concentrated slurry to the reactor through the reflux port for continuous reaction, and discharging the mother liquor from the reactor;

S323, when the solid content of the crystalline particles reaches 100-400 g/L, controlling the EDCF to be 40-55 kW/(m³·s); when the solid content of the crystalline particles reaches 300-600 g/L, controlling the EDCF to be 25-40 kW/(m³·s); when the solid content of the crystalline particles reaches 500-1000 g/L, controlling the EDCF to be 15-35 kW/(m³·s);

S324, continuing to control the pH value, the ammonia concentration and the temperature in the reaction process, stopping the reaction when the particle size D50 reaches 3.0-6.0 μm, and obtaining the small-particle ternary precursor slurry;

S4, carrying out solid-liquid separation, washing, drying and sieving on the ternary precursor slurry to obtain the ternary precursor of cathode materials for the lithium ion battery, wherein a preparation device for preparing the ternary precursor of the lithium ion battery comprises:

a reactor provided with a liquid inlet and an inner chamber, wherein the liquid inlet is connected with the inner chamber and an outside world, and the liquid inlet is provided on an upper part of the reactor;

a stirring drive system comprising a motor, a reducer and a stirring mechanism, wherein the reducer is connected to the motor and the stirring mechanism, the stirring mechanism is installed in the inner chamber of the reactor and comprises a stirring shaft and at least one turbine impeller, the stirring shaft is rotatably connected to the reducer and the turbine impeller that comprises a plurality of blades and a disc, the disc is connected to the stirring shaft, the blades extend outwards from a peripheral side of the disc obliquely in an arc, and a tilt angle of the blades is 30-80°; the blades each comprise a main blade and a secondary blade, one end of the main blade is fixedly connected to the disc, and the secondary blade extends outward from the other end of the main blade in the direction of an arc surface, wherein the secondary blade is in a sine curve, y=A sin ωx, an amplitude A is 0.1-1.0 times of the width of the blade, a period T=$2\pi/\omega$, having a range of 1-3, and a length of the secondary blade accounts for 10%-50% of a total length of the blade, wherein each turbine impeller further comprises a hub and a plurality of connection plates, the hub is located in the middle of the disc and is fixedly connected to the stirring shaft, and the connection plates are evenly distributed along the periphery of the disc, so that the main blades are obliquely fixed to the connection plates, wherein the length of the blade accounts for 10%-40% of a diameter of the turbine impeller, a ratio of the diameter of the turbine impeller to a diameter of the reactor is 0.3-0.6: 1, the reactor is internally provided with at least two layers of turbine impellers, each of the turbine impellers comprises 4-8 blades, and a ratio of a layer spacing between the turbine impellers to the diameter of the turbine impeller is 0.6-1.5:1;

a concentrator, a torque sensor and a tachometer, wherein the torque sensor and the tachometer are respectively connected to the stirring shaft, the reactor is further provided with a first liquid inlet, a second liquid inlet, a third liquid inlet, an overflow port and a reflux port; the first liquid inlet and the second liquid inlet are staggered at an upper part of the reactor, the first liquid inlet and the third liquid inlet are provided on the same side, the first liquid inlet is used for introducing an ammonia solution, the third liquid inlet is used for introducing a nickel cobalt manganese metal salt solution, the second liquid inlet is used for introducing an alkali solution, and a stagger angle between the first liquid inlet and the second liquid inlet is 90°-180°; the overflow port and the reflux port are spaced at a side of the reactor, the overflow port is higher than the reflux port, and the concentrator is respectively connected with the overflow port and the reflux port, wherein the overflow port is located at a position 0.80-0.85 times the height of a straight section of the reactor.

2. A preparation device for the preparation method for the ternary precursor of the lithium ion battery according to claim 1, comprising:
  a reactor provided with a liquid inlet and an inner chamber, wherein the liquid inlet is connected with the inner chamber and an outside world, and the liquid inlet is provided on the upper part of the reactor:
  a stirring drive system comprising a motor, a reducer and a stirring mechanism, wherein the reducer is connected to the motor and the stirring mechanism, the stirring mechanism is installed in the inner chamber of the reactor and comprises a stirring shaft and at least one turbine impeller, the stirring shaft is rotatably connected to the reducer and the turbine impeller that comprises a plurality of blades and a disc; the disc is connected to the stirring shaft, the blades extend outwards from a peripheral side of the disc obliquely in an arc, and a tilt angle of the blades is 30-80°; wherein the blades each comprise a main blade and a secondary blade, one end of the main blade is fixedly connected to the disc, and the secondary blade extends outward from the other end of the main blade in the direction of an arc surface, wherein the secondary blade is in a sine curve, $y=A \sin \omega x$, an amplitude A is 0.1-1.0 times of the width of the blade, a period $T=2\pi/\omega$, having a range of 1-3, and a length of the secondary blade accounts for 10%-50% of a total length of the blade; each turbine impeller further comprises a hub and a plurality of connection plates, the hub is located in the middle of the disc and is fixedly connected to the stirring shaft, and the connection plates are evenly distributed along the periphery of the disc, so that the main blades are obliquely fixed to the connection plates; the length of the blade accounts for 10%-40% of a diameter of the turbine impeller, a ratio of the diameter of the turbine impeller to a diameter of the reactor is 0.3-0.6:1, the reactor is internally provided with at least two layers of turbine impellers, each of the turbine impellers comprises 4-8 blades, and a ratio of a layer spacing between the turbine impellers to the diameter of the turbine impeller is 0.6-1.5:1:

a concentrator, a torque sensor and a tachometer, wherein the torque sensor and the tachometer are respectively connected to the stirring shaft, the reactor is further provided with a first liquid inlet, a second liquid inlet, a third liquid inlet, an overflow port and a reflux port, the first liquid inlet and the second liquid inlet are staggered at an upper part of the reactor, the first liquid inlet and the third liquid inlet are provided on the same side, the first liquid inlet is used for introducing an ammonia solution, the third liquid inlet is used for introducing a nickel cobalt manganese metal salt solution, the second liquid inlet is used for introducing an alkali solution, and a stagger angle between the first liquid inlet and the second liquid inlet is 90°-180°; the overflow port and the reflux port are spaced at a side of the reactor, the overflow port is higher than the reflux port, and the concentrator is respectively connected with the overflow port and the reflux port, wherein the overflow port is located at a position 0.8040.85 times the height of a straight section of the reactor.

* * * * *